Oct. 19, 1943.  R. L. GROSE  2,331,973
CONCEALED HEADLIGHT
Filed March 27, 1942  2 Sheets-Sheet 2
Fig.5.
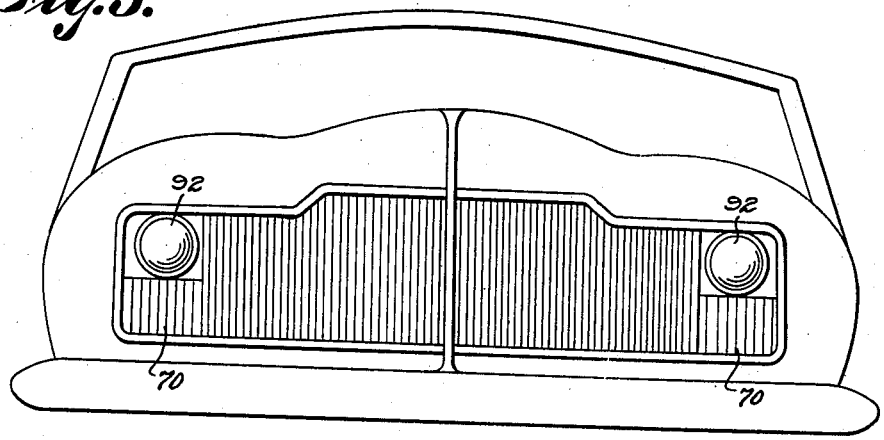
Fig.6.
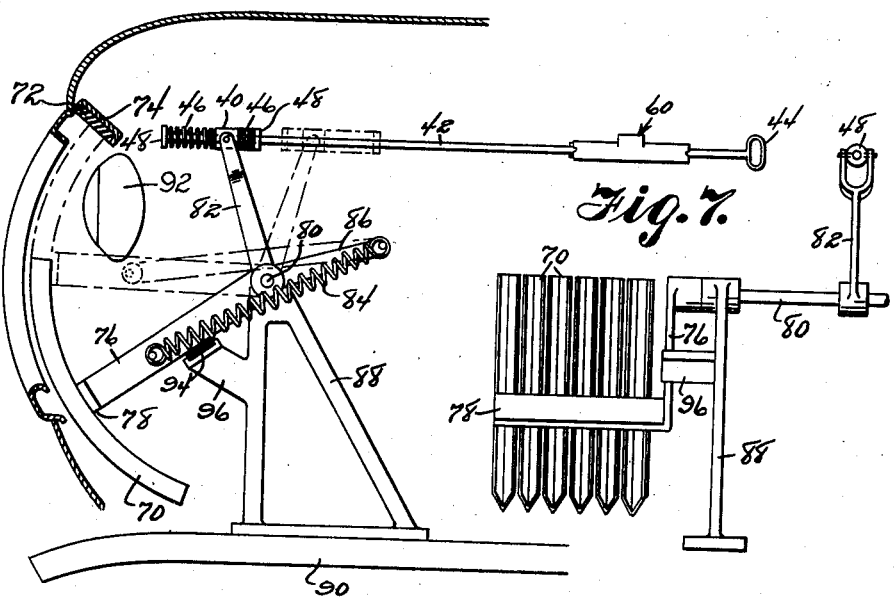
Fig.7.
Ralph L. Grose
INVENTOR.
BY
Victor J. Evans & Co.
ATTORNEYS Patented Oct. 19, 1943

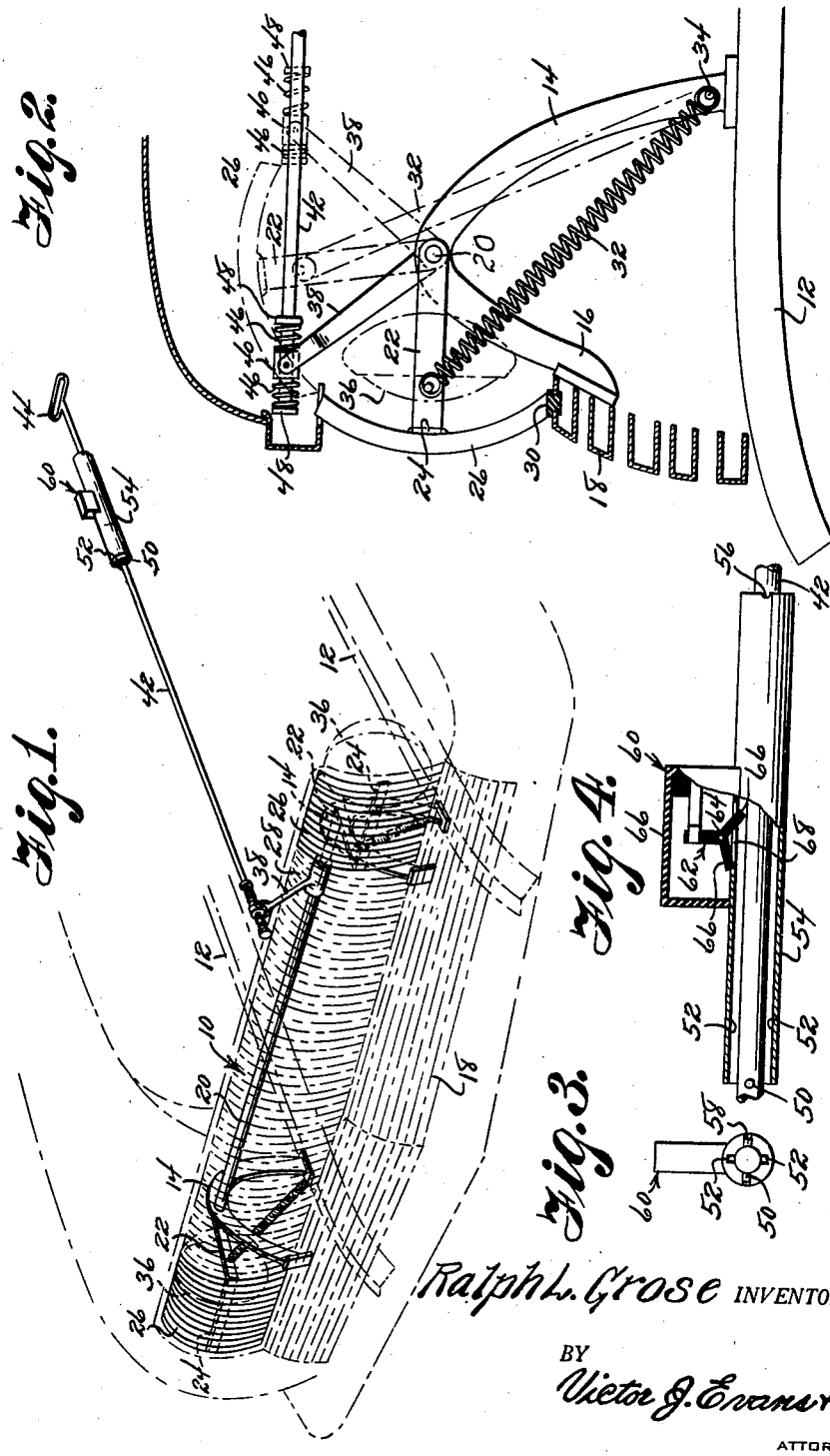

2,331,973

UNITED STATES PATENT OFFICE 2,331,973

CONCEALED HEADLIGHT

Ralph L. Grose, Detroit, Mich.

Application March 27, 1942, Serial No. 436,517

4 Claims. (Cl. 240—7.1)

My invention relates to automobiles, and has among its objects and advantages the provision of an improved headlight concealment wherein a portion of the trim or grille of the vehicle is utilized for masking and unmasking the headlights.

In the accompanying drawings:

Figure 1 is a perspective view outlining the trim of the vehicle illustrating my invention applied thereto;

Figure 2 is an enlarged sectional view illustrating the grille actuating means in side elevation;

Figure 3 is a detail view of a grille latch;

Figure 4 is a sectional view of the grille latch illustrating a headlight switch in association therewith;

Figure 5 is a front elevational view of the modified form of the grille;

Figure 6 is a view similar to Figure 2 but illustrating a different method of actuating the masking portion of the grille of Figure 5; and Figure 7 is a rear elevational view of one of the masking grille sections of Figure 5.

In the embodiment selected for illustration, Figure 1 illustrates the front portion of an automobile embodying a grille or trim 10. Upon the frame members 12 of the vehicle are fixedly mounted two brackets 14, each having a depending end portion 16 constituting a support for the fixed grille section 18, which may be welded thereto. A shaft 20 is rotatably journaled in the two brackets 14 transversely of the vehicle. Two right angular arms 22 are fixed to the ends of the shaft 20, and each arm 22 is provided with a right angular end portion 24 welded to the headlight masking grille section 26 constituting a continuation of the intermediate grille section 28.

Each masking section 26 normally rests on a resilient cushioning pad 30 attached to the fixed grille section 18. To the arms 22 are connected tension springs 32 anchored at 34 to their respective brackets 14 for yieldingly holding the sections 26 in their headlight masking positions, the headlights being illustrated in outline at 36.

To the shaft 20 is fixedly secured an arm 38 connected with a sleeve 40 slidably mounted on an actuating rod 42 provided with a handle 44 accessible by the operator of the vehicle. Compression springs 46 are interposed between the ends of the sleeve 40 and collars 48 secured to the rod 42. To unmask the headlight 36 of Figure 2, a pull is exerted on the rod 42 for pivoting the grille section 26 to its dotted line position. The tension of the springs 32 is increased upon movement of the grille sections 26 to their unmasking positions. To hold the grille sections 26 in their unmasking positions against the tension of the springs 32, the rod 42 is provided with a cross pin 50 slidable through a slot 52 extending lengthwise through a body 54 fixedly secured in any suitable manner to the vehicle. To latch the rod 42 in its retracted position, the rod is rotated ninety degrees after retraction to locate the cross pin in a slot 56 in the rear end of the body 54. When so latched, the forward spring 46 on the rod 42 is under considerable compression, as in Figure 2, so that the cross pin 50 is held firmly in the recess 56.

To pivot the grille sections 26 to their headlight masking positions, the rod 52 is rotated ninety degrees to permit the cross pin 50 to be advanced through the slot 52, after which the rod 42 is again rotated ninety degrees to locate the cross pin 50 in a slot 58 in the forward end of the body 54. With the pin so positioned, the rear spring 46 is subjected to more compression than the forward spring so as to hold the cross pin firmly in the recess 58. At the same time, the tension springs 32 hold the grille sections 26 firmly upon the cushion pads 30.

Figure 4 illustrates a headlight switch 60 mounted on the body 54, which switch includes a member 62 pivoted at 64 to the switch housing 66. Member 62 includes two arms 66 arranged in such angular relation as to locate one of the arms inside the slot 52 in the body 54, the body being provided with an opening 68 to accommodate the pivotal movement of the member 62. When the cross pin 50 is pulled in one direction through the slot 52, the pin is moved into engagement with one of the arms 66 to close the circuit (not shown) through the headlights and to pivot the member 62 to bring the other arm 66 into the path of the cross pin to be engaged thereby when the rod 42 is pushed forwardly to pivot the grille sections 26 to their masking positions and open the switch.

Figures 5, 6 and 7 illustrate a slightly different form wherein the grille sections 70 normally engage cushioning elements 72 anchored to a grille frame 74, with the sections 70 pivoting downwardly to unmasking positions. One of the grille sections 70 is illustrated in Figure 6 wherein the section is supported on an arm 76 having an end portion 78 welded to section 70. The arm 76 is pivotally mounted on a shaft 80 provided with an actuating arm 82 corresponding to the arm 38. The grille sections 70 are identically mounted so that the description of one will apply to both. Figure 6 illustrates a tension spring 84 as having one end connected with the arm 76 and its other end attached to an arm 86 attached to the bracket 88 secured to the frame member 90. Figure 6 illustrates the grille section 70 in its unmasking position with respect to the headlight 92, at which time the arm 76 is at rest on a cushioning pad 94 supported by an arm 96 on the bracket 88. With the arm 76 positioned according to Figure 6, the spring 84 lies underneath the shaft 80 so as to exert a pull on the arm to hold it firmly against the cushioning pad 94. When the grille section 70 is pivoted to its headlight masking position, the spring 84 lies above the shaft 80 so as to hold the grille section in firm engagement with the cushioning pad 72.

Without further elaboration, the foregoing will so fully illustrate my invention, that others may, by applying current knowledge, readily adapt the same for use under various conditions of service.

I claim:

1. In an automotive vehicle, the combination of a main grille, headlamps, movable grille sections comprising continuations of said main grille and normally masking said headlamps, two fixed brackets, a shaft rotatably mounted on said brackets, arms fixedly connecting the grille sections with said shaft, an arm fixed to said shaft, spring means acting on said shaft to yieldingly hold the grille sections in their headiamp masking positions, a rod slidably connected with said arm, springs interposed between said rod and said arm, a fixed body having an opening therethrough for slidably supporting said rod, said body having a notch in each end, a pin on said rod selectively receivable in said notches in the respective headlamp masking and unmasking positions of said grille sections, said pin being slidable through said body when said rod is rotated to a predetermined position, and a headlamp switch having a switch element actuated by said pin in its passage through said body.

2. The invention described in claim 1 wherein cushioning means are provided for said grille sections in their headlamp masking positions.

3. In an automotive vehicle having frame members, the combination of headlamps, a main grille located forwardly of said headlamps, grille sections comprising continuations of said main grille and normally respectively masking said headlamps, means pivotally supporting said grille sections, brackets attached to said frame members for supporting said means, and a common actuating means having a part fixed to said first mentioned means and rotatably supported on said brackets for pivoting said grille sections to headlamp unmasking positions.

4. In an automotive vehicle having a frame, the combination of headlamps, a main grille located forwardly of said headlamps, grille sections comprising continuations of said main grille and normally respectively masking said headlamps, supports mounted on said frame, means rotatably mounted on said supports for supporting said grille sections, and a common actuating means for said first mentioned means to pivot said grille sections to headlamp unmasking positions.

RALPH L. GROSE.